(12) United States Patent
Nigam et al.

(10) Patent No.: US 11,720,461 B2
(45) Date of Patent: Aug. 8, 2023

(54) AUTOMATED DETECTION OF CODE REGRESSIONS FROM TIME-SERIES DATA

(71) Applicant: Microsoft Technology Licensing, LLC, Redmond, WA (US)

(72) Inventors: Rahul Nigam, Bothell, WA (US); Andrei Nicolae, Bellevue, WA (US); Mark Raymond Gilbert, Issaquah, WA (US); Vinod Mukundan Menon, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1032 days.

(21) Appl. No.: 16/351,384

(22) Filed: Mar. 12, 2019

(65) Prior Publication Data

US 2020/0293900 A1 Sep. 17, 2020

(51) Int. Cl.
| | |
|---|---|
| *G06N 3/04* | (2023.01) |
| *G06F 11/30* | (2006.01) |
| *G06N 3/088* | (2023.01) |
| *G06F 18/21* | (2023.01) |
| *G06F 18/2431* | (2023.01) |
| *G06N 20/20* | (2019.01) |
| *G06N 20/10* | (2019.01) |

(52) U.S. Cl.
CPC ............ *G06F 11/302* (2013.01); *G06F 18/21* (2023.01); *G06F 18/2431* (2023.01); *G06N 3/04* (2013.01); *G06N 3/088* (2013.01); *G06N 20/10* (2019.01); *G06N 20/20* (2019.01)

(58) Field of Classification Search
CPC .......... G06N 3/088; G06N 3/04; G06N 20/10; G06N 20/20; G06K 9/6217; G06K 9/628
See application file for complete search history.

(56) References Cited

U.S. PATENT DOCUMENTS

| | | | |
|---|---|---|---|
| 8,205,259 | B2 | 6/2012 | Stute |
| 8,949,677 | B1 | 2/2015 | Brundage et al. |
| (Continued) | | | |

FOREIGN PATENT DOCUMENTS

| | | |
|---|---|---|
| CN | 108445861 A | 8/2018 |

OTHER PUBLICATIONS

Streiffer et al ("Learning to Simplify Distributed Systems Management" Dec. 2018) (Year: 2018).*

(Continued)

*Primary Examiner* — Lut Wong

(57) ABSTRACT

In non-limiting examples of the present disclosure, systems, methods and devices for detecting and classifying service issues associated with a cloud-based service are presented. Operational event data for a plurality of operations associated with the cloud-based application service may be monitored. A statistical-based unsupervised machine learning model may be applied to the operational event data. A subset of the operational event data may be tagged as potentially being associated with a code regression, wherein the subset comprises a time series of operational event data. A neural network may be applied to the time series of operational event data, and the time series of operational event data may be flagged for follow-up if the neural network classifies the time series as relating to a positive code regression category.

20 Claims, 10 Drawing Sheets

(56) References Cited

U.S. PATENT DOCUMENTS

| | | | |
|---|---|---|---|
| 9,626,277 | B2 | 4/2017 | Shah et al. |
| 9,652,354 | B2 | 5/2017 | Filimonov et al. |
| 10,261,849 | B1 * | 4/2019 | Burke ................. G06F 11/0793 |
| 2016/0062816 | A1 | 3/2016 | Ivanova et al. |
| 2017/0192872 | A1 | 7/2017 | Elgrably et al. |
| 2018/0270261 | A1 | 9/2018 | Pande et al. |
| 2019/0012254 | A1 | 1/2019 | Gupta et al. |

OTHER PUBLICATIONS

Righi et al ("A Survey on Global Management View: Toward Combining System Monitoring, Resource Management, and Load Prediction" Jan. 2019) (Year: 2019).*

"Anomaly Detection", Retrieved From: https://web.archive.org/web/20170713005058/https://www.loggly.com/docs/anomaly-detection/, Jul. 13, 2017, 6 Pages.

Aboode, Adam, "Anomaly Detection in Time Series Data Based on Holt-Winters Method", In Master's Thesis of The School of Electrical Engineering and Computer Science, Mar. 12, 2018, 62 Pages.

Bansal, et al., "Anomaly Detection in Azure Stream Analytics", Retrieved From: https://web.archive.org/web/20190111151415/https://docs.microsoft.com/en-us/azure/stream-analytics/stream-analytics-machine-learning-anomaly-detection, Jul. 12, 2018, 11 Pages.

Ihler, et al., "Adaptive Event Detection with Time-varying Poisson Processes", In Proceedings of the 12th ACM SIGKDD International Conference on Knowledge Discovery and Data Mining, Aug. 20, 2006, pp. 207-216.

"International Search Report and Written Opinion Issued in PCT Application No. PCT/US2020/021054", dated Jun. 25, 2020, 16 Pages.

Pokrywka, Rafał, "Reducing False Alarm Rate in Anomaly Detection with Layered Filtering", In The Proceedings of International Conference on Computational Science, Jun. 23, 2008, pp. 396-404.

Shipmon, et al., "Time Series Anomaly Detection: Detection of Anomalous Drops with Limited Features and Sparse Examples in Noisy Highly Periodic Data", In Journal of Computing Research Repository, Aug. 11, 2017, 9 Pages.

* cited by examiner

AUTOMATED DETECTION OF CODE REGRESSIONS FROM TIME-SERIES DATA

BACKGROUND

As computing has increasingly moved toward the cloud, systems that support large numbers of users and the cloud-based applications that they utilize are constantly being modified. The infrastructure of cloud-based systems requires constant monitoring just to maintain, not to mention to update and add additional features and functionality. As new software builds are added to the infrastructure of cloud-based systems it can be difficult to determine whether operational failures are related to code defects, network issues, and/or hardware problems in the service. Further, even if engineering teams know the general cause of a service issue, it is often difficult for those teams to identify the urgency of those issues.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for identifying and classifying code regressions, network issues and/or hardware problems from telemetry data associated with cloud-based application services. The described mechanisms include a three-layer approach that first takes time series data for a large amount of telemetry data and applies an unsupervised machine learning model to that data in order to preliminarily identify a subset of the data as potentially relating to a code regression, network issue and/or hardware problem. The second layer takes the subset and applies a neural network to it to further reduce the size of the data that may relate to code defects, network issues and/or hardware problems. The neural network may be applied to the raw data and/or a graphical image matrix representing that raw data. The neural network may be utilized to classify the data into one or more additional categories. The third layer applies one or more language processing models to operational data logs associated with the smaller subset that has been identified and classified by the convolutional neural network. The language processing model may further classify the dataset into categories such as severity of issue type, operational error type, location of issue, and/or identity of server or server farm that corresponds to an issue. The fully classified data may then be sent to human reviewers for performing one or more follow-up actions on.

BRIEF DESCRIPTION OF THE DRAWINGS

Non-limiting and non-exhaustive examples are described with reference to the following figures.

DETAILED DESCRIPTION

Figure 1:
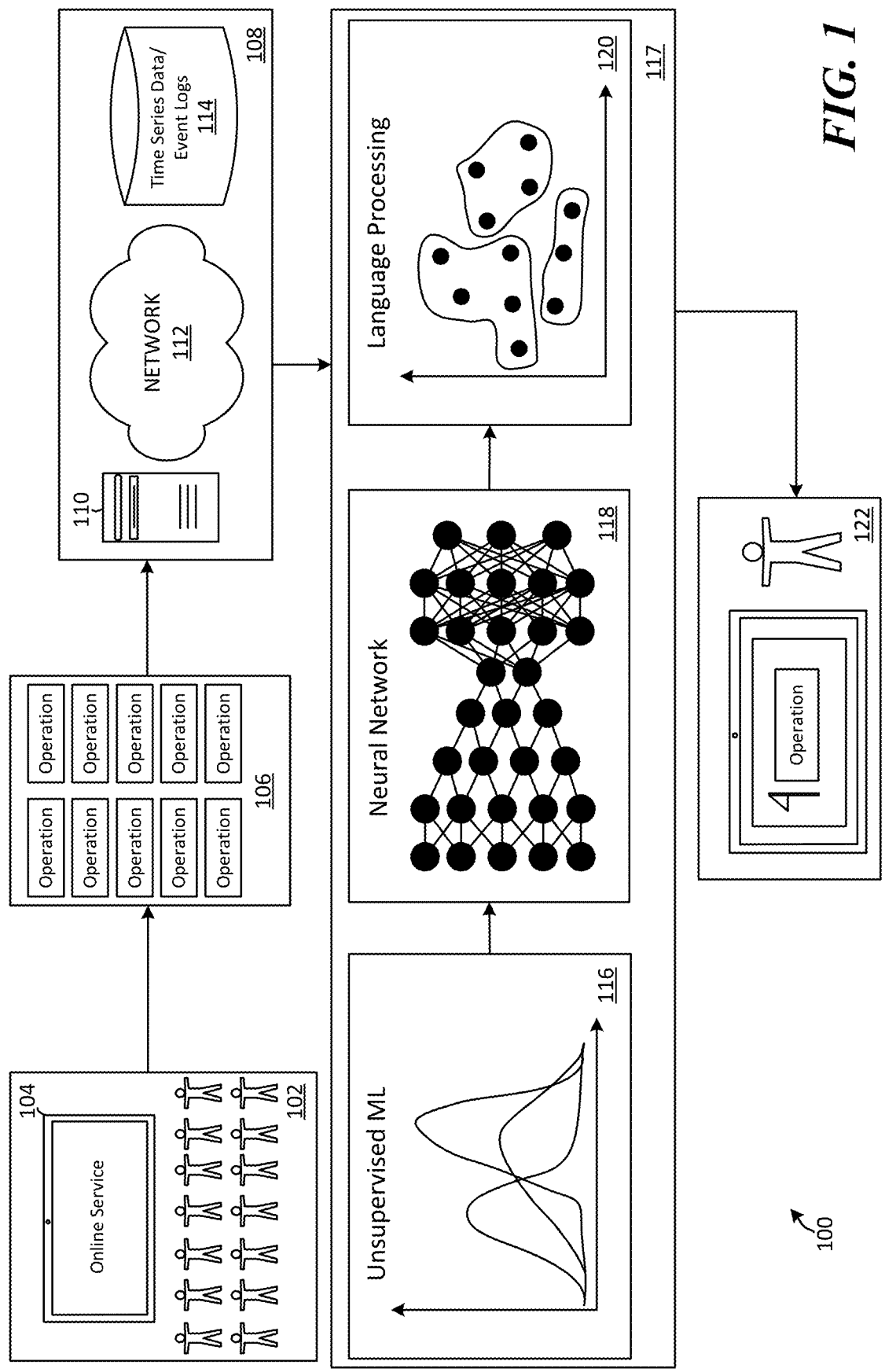
FIG. 1 is a schematic diagram illustrating an example distributed computing environment for detecting and classifying a service issue associated with a cloud-based application service.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for detecting code regressions, network issues and hardware problems associated with cloud-based application services. The code regressions may be included in new software packages, updates, and/or patches, for example. In some examples, the code regressions may be associated with one or more cloud-based applications, such as cloud-based document processing applications, spreadsheet applications, calendar applications, presentation applications, storage applications, video applications, real-time electronic messaging applications, voice messaging applications, video communication applications, and/or email applications. In some examples, a system monitor may monitor signals associated with operation failures related to one or more cloud-based applications. For example, when an operation for a cloud-based application fails, and/or an operation for a cloud-based application causes an application crash or malfunction when it is performed, a signal indicating that there was an operation event, or operation failure, may be reported to the system monitor. The system monitor may monitor one or more operations associated with cloud-based applications. For example, the system monitor may monitor "save" operations, "send" operations, "new document" operations, "copy" operations, "paste" operations, and any other operation that may be performed by cloud-based applications.

A telemetry service associated with the cloud-based application service may receive operational data associated with each operation that is initiated and/or executed by users accessing applications hosted by the cloud-based application service. The information that is collected by the telemetry service may include: timestamped information corresponding to each operation that was initiated by the cloud-based application service, the amount of time that those operations took to complete and/or time out, the identity of those operations, what the result of each initiated operation was (e.g., unexpected failure, success, expected failure), and/or what server or server farm executed each operation. The systems, methods and devices described herein may apply a three-layered approach to identify whether service issues associated with the cloud-based application service relate to code regressions, network issues and/or hardware problems. Those mechanisms also allow IT support and developers for the system to identify what operations and/or code chunks are responsible for the service issues and what the severity of those issues is.

The first layer of operations takes operational event data for one or more time series and applies an unsupervised statistical machine learning model to it. The unsupervised machine learning model may identify drops in service quality that may relate to one or more of code regressions, network issues and/or hardware problems. The machine learning models may identify such issues by identifying datapoints that fall out of a normalized baseline (baseline for unexpected errors, expected errors, ratio of unexpected errors to successful operations) for a particular operation. Although the unsupervised machine learning models that may be applied in the first layer are typically computationally cheap, and they are capable of identifying a fraction of operations and/or time series that may relate to potential service issues out of a much larger dataset, they may still have a relatively large false positive rate associated with them.

The second layer of operations takes the subset of operational event data and/or time series data that has been identified as potentially relating to a code regression, network issue and/or hardware problem, and feeds that data to a neural network that has been manually trained on similar datasets to classify such datasets into categories. The categories may include a positive identification that a dataset relates to a code regression, network issue and/or hardware problem; a negative indication that a dataset relates to a code regression, network issue and/or hardware problem; percentage likelihood classifications that a dataset relates to a code regression network issue and/or hardware problem; and/or a severity of the issue corresponding to the dataset if it is identified as relating to a code regression, network issue and/or hardware problem. The neural network may be applied to the raw data and/or one or more graphical image matrix representations of the dataset. In some examples the neural network may comprise a convolutional neural network.

The third layer of operations takes the subset of operational event data and/or time series data that has been classified by the neural network as relating to a code regression, network issue and/or hardware problem, and parses operation logs for each of those operations in the dataset to further classify the dataset by one or more of: severity, operation type, geographic location of origin, and/or server or server farm that the issue relates to. The third layer may also output a human-readable summary of the occurring errors. In some examples, the candidate items may then be passed to a processing queue that determines whether any duplicates from previous days exist, and those non-duplicates may be sorted by severity and/or urgency. One or more engineering teams can then review the candidate items in the queue and escalate any of those items as appropriate.

The systems, methods, and devices described herein provide technical advantages for identifying the cause of service issues for cloud-based application services, and classifying those causes based on their severity and/or urgency so that they can be appropriately addressed by engineering teams. The mechanisms described herein utilize the advantages of a three-layered approach that applies three different types of modeling techniques to first identify a subset of operations that may be problematic in the service utilizing a computationally cheap statistical machine learning model that has a high rate of false positive identification associated with it, but then reducing the size of that subset by applying a more computationally expensive neural network to the subset, and finally applying one or more language processing models to the data that has been further reduced in size by the classifying that has been performed by the neural network. Processing and human review costs associated with traditional approaches to this problem that would simply apply a cheap but ineffective modeling technique to the full set of operational event data are greatly reduced by further application of a neural network to the first subset of data. Processing and memory costs are also reduced by parsing through the operational logs of the smaller subset classified by the neural network due to the reduced size of the data that needs to be processed for urgency by the language processing models. Further, the application of the language processing models to the event logs provides processing and human review savings in that engineering teams do not have to manually review each event log from the smaller subset classified by the neural network. Rather, those teams can focus their time, energy, and computational resources dealing with the issues that are affecting the service in the most urgent manners.

FIG. 1 is a schematic diagram illustrating an example distributed computing environment 100 for detecting and classifying a service issue associated with a cloud-based application service. Distributed computing environment 100 includes application user sub-environment 102, operations 106, processing models sub-environment 117, and operation flagging sub-environment 122. Distributed computing environment 100 also includes network and processing sub-environment 108, which comprises network 112, via which any of the computing devices in distributed computing environment 100 may communicate with one another; server computing device 110; and time series data/event logs database 114.

A monitoring service that monitors operational data from one or more cloud-based applications may reside on one or more computing devices in network and processing sub-environment 108, and the monitoring service may receive operational data from a telemetry service. In some examples, the monitoring service and the telemetry service may be different services. In other examples, the monitoring service and the telemetry service may be the same service. The telemetry service may receive operational data (e.g., operational success counts, operational failure counts, operation latency data, etc.), which can be utilized by one or more monitors of the monitoring service. For example, one or more cloud-based applications may report operational errors to the telemetry service and monitors of the monitoring service may determine whether drops in quality of services associated with one or more cloud-based applications correspond to code regressions in new or modified operations included in new software builds, server issues and/or network problems. In some examples, operational successes and errors may be automatically reported to a telemetry database by the cloud-based applications when they occur. In other examples, an opt-in system may exist such that, at least in the production environments, users must opt-in to allow the operational data to be automatically reported to the telemetry service/database.

The monitoring service and/or the telemetry service may store time series data associated with the application operations in time series/data event logs database 114. The time series information may include timestamped information corresponding to each operation that was initiated by the cloud-based application service, the amount of time that those operations took to complete and/or time out, the identity of those operations, what the result of each initiated operation was (e.g., unexpected failure, success, expected failure), and/or what server or server farm executed each operation.

A plurality of cloud-based application users in application user sub-environment 102 may access and perform various actions in applications hosted on the cloud-based application service. There may be hundreds, thousands, or even millions of cloud-based application users simultaneously accessing the cloud-based application service and performing actions on the applications hosted thereon. When each of those actions is performed, a corresponding operation request is sent to the cloud-based application service in network and processing sub-environment 108. This is illustrated by operations 106, which shows a plurality of operation requests being sent from computing devices in application user sub-environment 102 to the cloud-based application service in network and processing sub-environment 108. As described above, when each of those operations is executed by the cloud-based application service, information corresponding to that execution is stored in time series data/event logs database 114, which can be processed by a telemetry service to identify whether there are code regressions, hardware and/or network issues that are affecting the user experience in the cloud-based application service. In some examples, the processing performed by the telemetry service may be performed by one or more server computing devices, such as server computing device 110. In other examples, the processing of the operational/telemetry data may be performed on local computing devices associated with developer, engineering and/or review teams, such as computing devices in operation flagging sub-environment 122.

The processing of the operational data stored in time series data/event logs database 114 is illustrated by processing models sub-environment 117. In examples, time series data for all or a subset of operations executed by the cloud-based application service may be provided to a statistical-based unsupervised machine learning model to identify whether there are potential code regressions associated with one or more of those operations. This is illustrated by unsupervised machine learning sub-environment 116. The machine learning model applied to the time series data may comprise a Gaussian model, a bloxplot method model, a one class support vector machine model, and/or a density-based spatial clustering of applications with noise model, for example. Those models may identify whether one or more operational events in a time series fall within normalized patterns of the system, or whether they are outliers that may need further review. In some examples, the machine learning model may be applied to one or more of: number of successes in a time series ("S1"); number of unexpected failures in a time series ("S2"); and/or expected failures in a time series ("S3"). In additional examples, the machine learning model may be applied to a function of one or more of those datapoints (e.g., "S4" where S4=f(S1, S2, S3)).

Although these types of unsupervised machine learning models are traditionally computationally cheap and fast, they do not provide a high degree of accuracy in their classification. This can be problematic for identifying potential issues in large cloud-based application services because the machine learning model(s) may tag a high number of operations as relating to code regressions which ultimately end up being false positives. For example, such models may tag upwards of two-thousand operational events per day as relating to code regressions, with each of those events potentially needing further review. As such, the follow-up resources needed to deal with those false positives can be overwhelming even for cloud-based services with plentiful resources.

According to examples, rather than sending all of the operational events flagged by the machine learning model(s) at unsupervised machine learning sub-environment 116 directly to manual reviewers, the telemetry system may pass those flagged operational events and/or time series data associated with those flagged operational events to a neural network, as illustrated by neural network sub-environment 118. In examples, the neural network may comprise a convolutional neural network.

The information passed to the neural network may include time series data associated with the flagged operational events, including each flagged datapoint and/or time series information for a corresponding operation that precedes and/or follows each flagged datapoint. For example, if an unsupervised machine learning model flags one or more operations executed at time X as potentially relating to a code regression, data associated with execution of those one or more operations may be passed to the neural network alone or in combination with data associated with operations executed from a specified duration of time preceding time X until time X and/or from time X to a specified duration of time following time X. In some examples, the data may be processed by the neural network in its raw relational or hierarchical form. In other examples, the data may be processed by the neural network as a graphical image representation of the raw data (i.e., computer-vision based). In some examples, the neural network may be applied to one or more of: number of successes in a time series ("S1"); number of unexpected failures in a time series ("S2"); and/or expected failures in a time series ("S3"). In additional examples, the neural network may be applied to a function, or image matrix representation of a function, of one or more of those datapoints (e.g., "S4" where S4=f(S1, S2, S3)).

Additional detail regarding processing of the operational data by the neural network is provided below in association with FIG. 3 and FIG. 4 and their corresponding descriptions. While being more cost intensive from a processing standpoint, the neural network may provide upwards of a 90% accuracy rate for correctly classifying operational events and/or time series datapoints as relating to a code regression, network issue and/or hardware problem, with that accuracy getting better with each additional supervised training cycle that it moves through.

Once the smaller subset of flagged operations and/or time series datapoints have been identified/flagged by the neural network at neural network sub-environment 118, that smaller subset of data may be passed for processing by one or more language processing models in language processing sub-environment 120 to determine what the cause of each flagged issue was (e.g., code regression, network error, hardware issue, etc.), as well as what the severity and/or urgency of the issue is. The one or more language processing models may be one or more of: a recurrent neural network; a convolutional neural network; a bag-of-words model; a rule-based model; a random forest model; and/or a word segmentation model, for example. For example, operation logs associated with each operation in the subset that have been flagged by the neural network at neural network sub-environment 118 are further processed by one or more language processing models in language processing sub-environment 120.

The operation logs may include information for each flagged operation, including: the identity of each flagged operation, the result of each flagged operation (e.g., successful, unexpected failure, expected failure), a time that each flagged operation was initiated and/or executed, a duration of time that each flagged operation took to execute successfully and/or time out, and/or an identity of a server or server farm that executed each flagged operation. The language processing models may classify each flagged operation based on its operation type, execution location, error code, latency, and/or severity. The severity classification may relate to how severe an issue is based on its effects on the cloud-based application users in application user sub-environment 102 (e.g., how many users are affected; how long are users affected; does the issue crash applications and/or entire devices; etc.). Although language processing models and parsing of operational logs is expensive from a processing standpoint, there are much fewer logs to process at this third layer due to the pre-processing that has been performed by the unsupervised machine learning processing in unsupervised machine learning sub-environment 116 and the neural network processing in neural network sub-environment 118.

Once the issues have been classified at language processing sub-environment 120, those issues and their classifications may be sent for human review in operation flagging sub-environment 122. Human reviewers and engineers may quickly and easily parse through issues according to their severity based on the classification that has been accomplished in language processing sub-environment 120, and the reviewers and engineers may address those issues based on the type of error that each issue has been classified as relating to.

Figure 2:
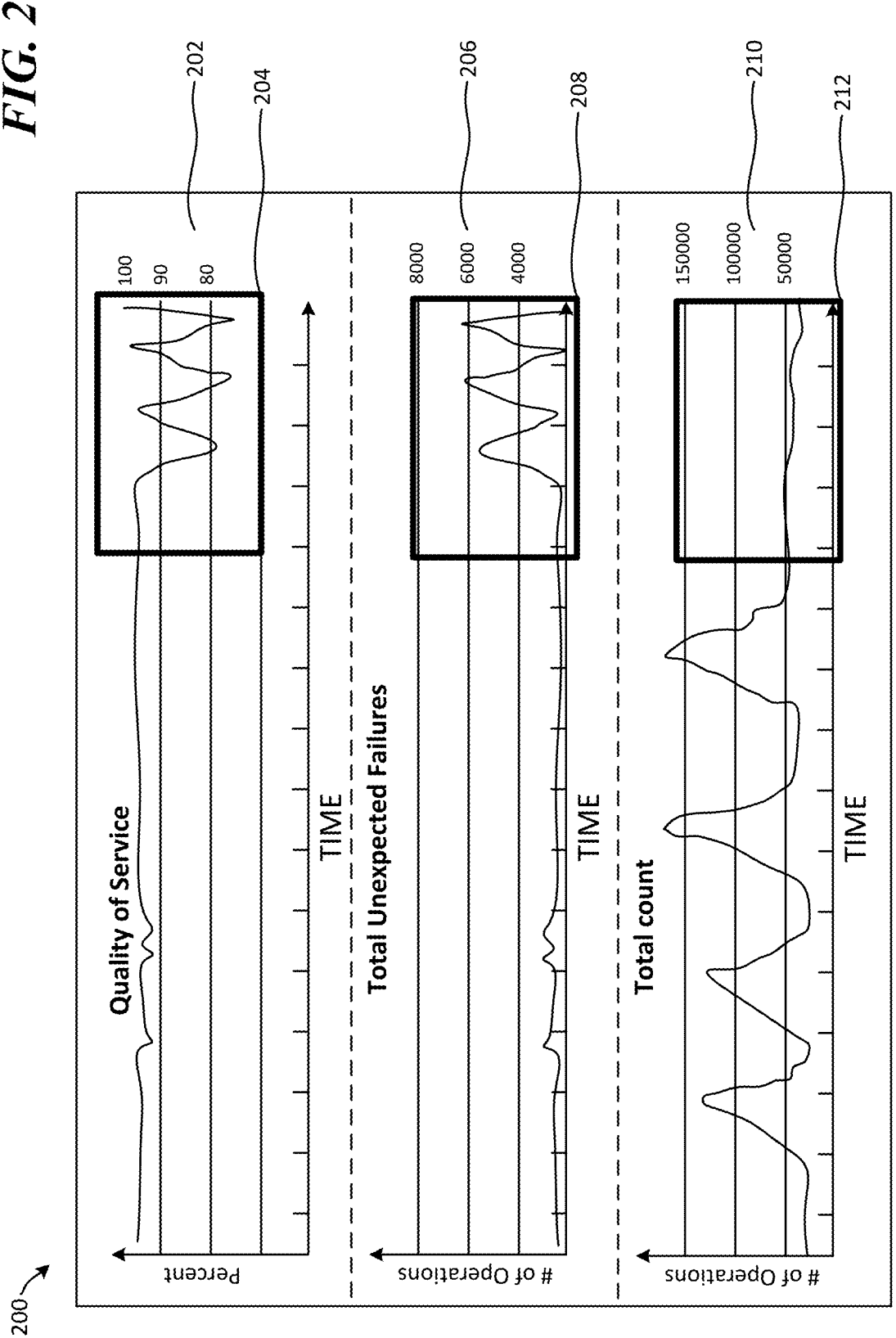
FIG. 2 illustrates exemplary graphs comprised of operational error data from a cloud-based application service.

FIG. 2 illustrates exemplary graphs 200 comprised of operational error data from a cloud-based application service. Graph 202 is a quality of service graph for a time series of operational event data that represents a percentage of successful operations of a specific operation type (in the Y-axis) executed over a duration of time (in the X-axis). Graph 206 is a total unexpected failures graph for a time series of operational event data that represents a total number of unexpected operational failures for a specific operation type (in the Y-axis) executed over a duration of time (in the X-axis). Graph 210 is a total number of executed operations, whether successful or unsuccessful, (in the Y-axis) executed over a duration of time (in the X-axis). The time series represented by each of graphs 202, 206 and 210 is the same time series. That is, the time represented by each X-axis for those graphs is the same specific time and time duration, and each of those graphs represents operational data for the same specific operation.

In this example, an unsupervised machine learning model applied to the time series may have flagged a portion of each graph as potentially relating to a code regression, network error and/or hardware issue. This is illustrated by the bold boxes (i.e., box 204, box 208, and box 212). As illustrated by the data represented in box 204 of the quality of service graph 202, the percentage of successfully executed operations for the specific operation is spiking in a downward manner from approximately 100% down to approximately 75%. As illustrated by the data represented in box 208 of the total unexpected failures graph 206, the number of unexpected failures for that same time period is spiking in an upward manner from approximately 1000 unexpected errors per unit of time to approximately 6000 unexpected errors per unit of time. As illustrated by the data represented in box 212 of the total count graph 210, the number of operations executed during that same period of time is relatively constant, in the approximately 50,000 operations per unit of time range. One or more unsupervised machine learning models applied to this time series may identify a pattern indicating that the operations executed in the period of time defined by boxes 204, 208 and 212 potentially relate to a code regression, a network issue, and/or a hardware problem. The numbers and values shown in each of graphs 202, 206 and 210 are exemplary, and it should be understood that other numbers, values, percentages and graph patterns may be identified via application of one or more unsupervised machine learning models as relating to a potential issue.

Figure 3:
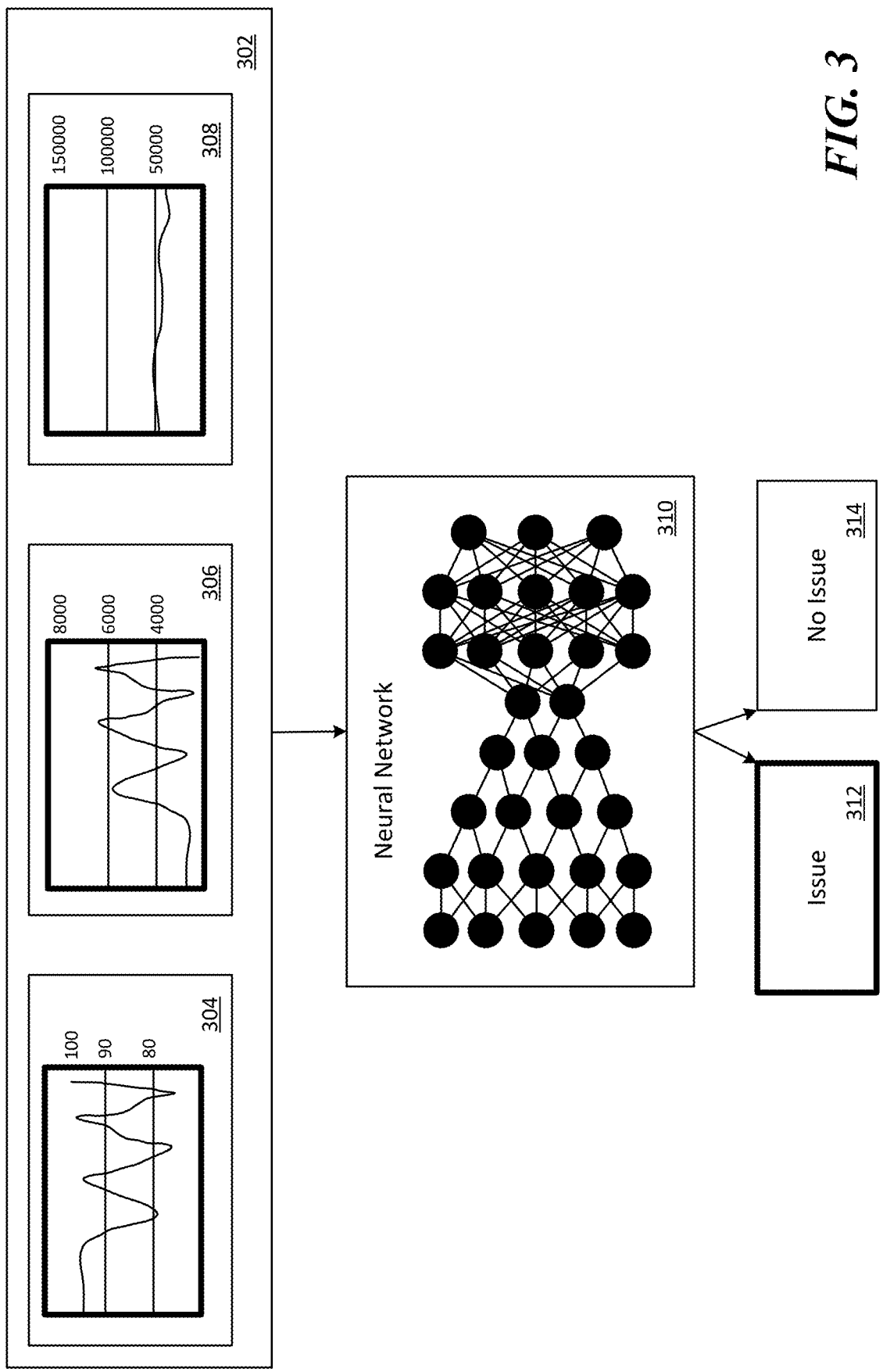
FIG. 3 illustrates the utilization of a convolutional neural network for processing operational error data to identify and classify service issues associated with a cloud-based application service.

FIG. 3 illustrates the utilization of a convolutional neural network 310 for processing operational error data to identify code regressions associated with a cloud-based application service. The boxes and corresponding graph data from FIG. 2 are again represented by partial graphs sub-environment 302, which includes box 304 (corresponding to box 204 in FIG. 2 representing the quality of service graph data that has been flagged by one or more unsupervised machine learning models), box 306 (corresponding to box 208 in FIG. 2 representing the unexpected failure graph data that has been flagged by one or more unsupervised machine learning models), and box 208 (corresponding to box 212 in FIG. 2 representing the total executed operations graph data that has been flagged by one or more unsupervised machine learning models).

Data corresponding to the time represented in each of boxes 304, 306 and 308 for the specific operation that each of those graphs represent may be provided to convolutional neural network 310, which has been trained to identify code regressions, network errors and/or hardware issues associated with operations in a cloud-based application service. In some examples, only the time window represented by each of boxes 304, 306 and 308 may be provided to neural network 310. That is, in some examples, only the specific time windows and operational data in those time windows that has been flagged by the machine learning models may be provided to the neural network. In other examples, operational data for those time windows and for a specified duration of time preceding and/or following each of those time windows may be provided to neural network 310 for classification. The time series provided to neural network 310 may thus represent seconds, minutes, hours, days, weeks, or months of operational data for a specific operation.

In this example, neural network 310 has been trained to provide one of two outputs for each input time series—either "issue" 312 (i.e., the data represented by the time series relates to a code regression, network issue and/or hardware problem), or "no issue" 314 (i.e., there are not code regressions, network issues and/or hardware problems represented in the time series data). However, neural network 310 may be trained to classify time series operational data in additional categories, including: a specific type of error classification (e.g., code regression, network issue, hardware problem), a percentage likelihood that time series operational data relates to a specific type of problem, a severity of a flagged issue, etc.

Figure 4:
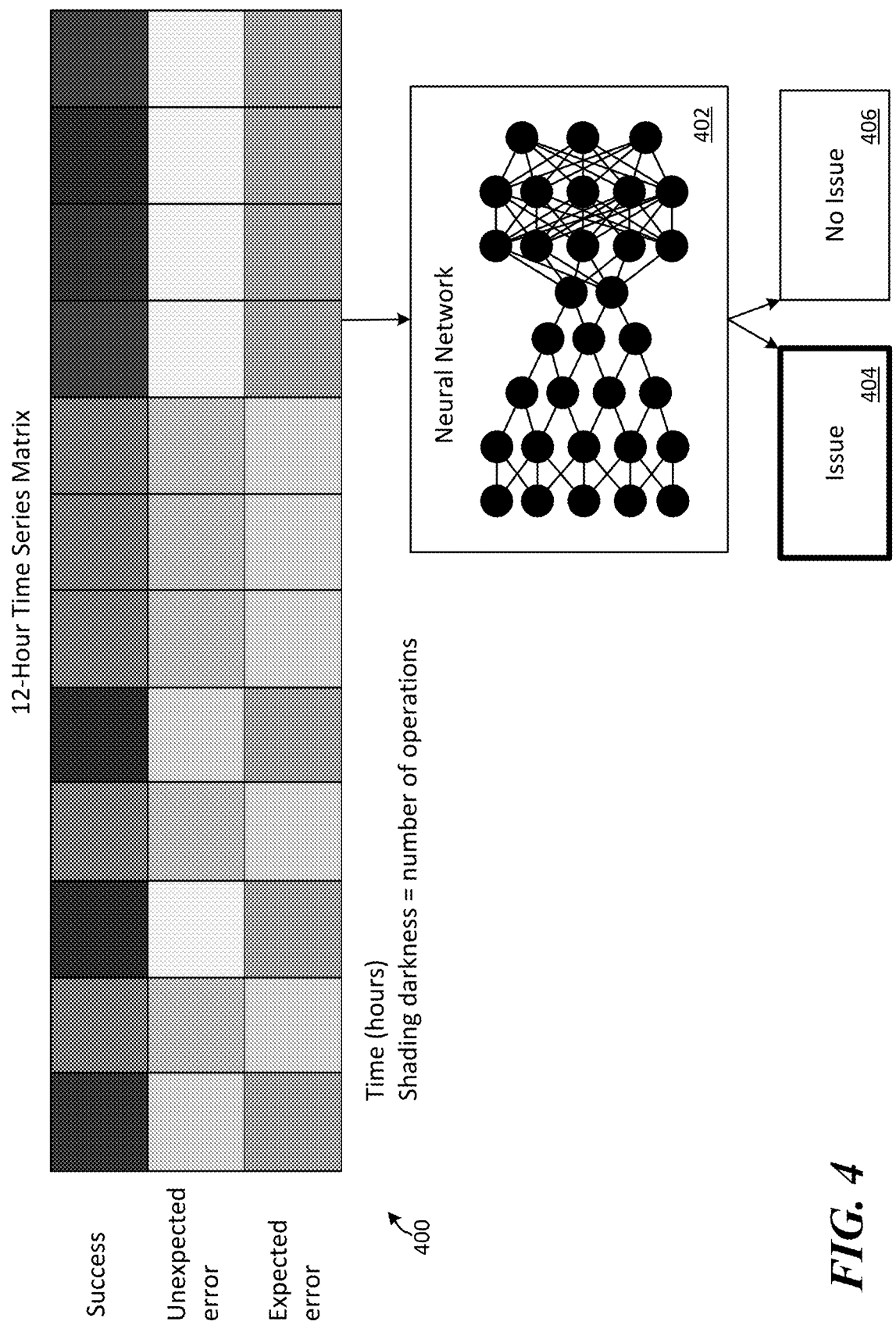
FIG. 4 illustrates a graphical image representation of a time series that may be provided to a neural network for classification of potential operational errors.

FIG. 4 illustrates a graphical image representation of a time series 400 that may be provided to a neural network for classification of potential operational errors. In this example, each block in time series 400 represents one hour of operational data for a specific operation. The shading of each block represents a number of successes, unexpected errors or expected errors, based on the data represented in each corresponding row. The darker the shading of a block, the more operations falling into the corresponding category (success, unexpected error, expected error). In this example, each block in the top row of blocks represents a number of operations of a specific operation type that were successfully executed for an hour of the time series represented by each corresponding block; each block in the middle row of blocks represents a number of unexpected errors for the specific operation type that were received for an hour of the time series represented by each corresponding block; and each block of the lower row of blocks represents a number of expected errors for the specific operation type that were received for an hour of the time series represented by each corresponding block.

In this example, neural network 402 has been trained to classify three-by-twelve graphical representations of data as illustrated by time series 400. However, it should be understood that neural network 402 may additionally or alternatively be trained to classify graphical representations of time series data that have more or less units included in them (e.g., ten-by-ten, twelve-by-twelve, etc.). Similarly, while neural network 402 is illustrated as having been trained to classify data based on combined graphical representations of three value types (i.e., success, unexpected error, expected error), neural network 402 may additionally or alternatively be trained to classify data based on a single value type and/or any combination of those value types. Additionally, while neural network 402 is illustrated in this example as having been trained to classify time series data into either an "issue" 404 category or a "no issue" 406 category, it should be understood that neural network 402 may be trained to classify time series data into one or more alternative or additional categories (e.g., severity of issue, type of issue, etc.). Furthermore, while the graphical representation of the data is illustrated as being fed to neural network 402 as blocks with shading representing various values, other graphical representations of that same data may be generated and fed to neural network 402 for classification depending on what data types and/or image types neural network 402 has been trained on.

Figure 5A:
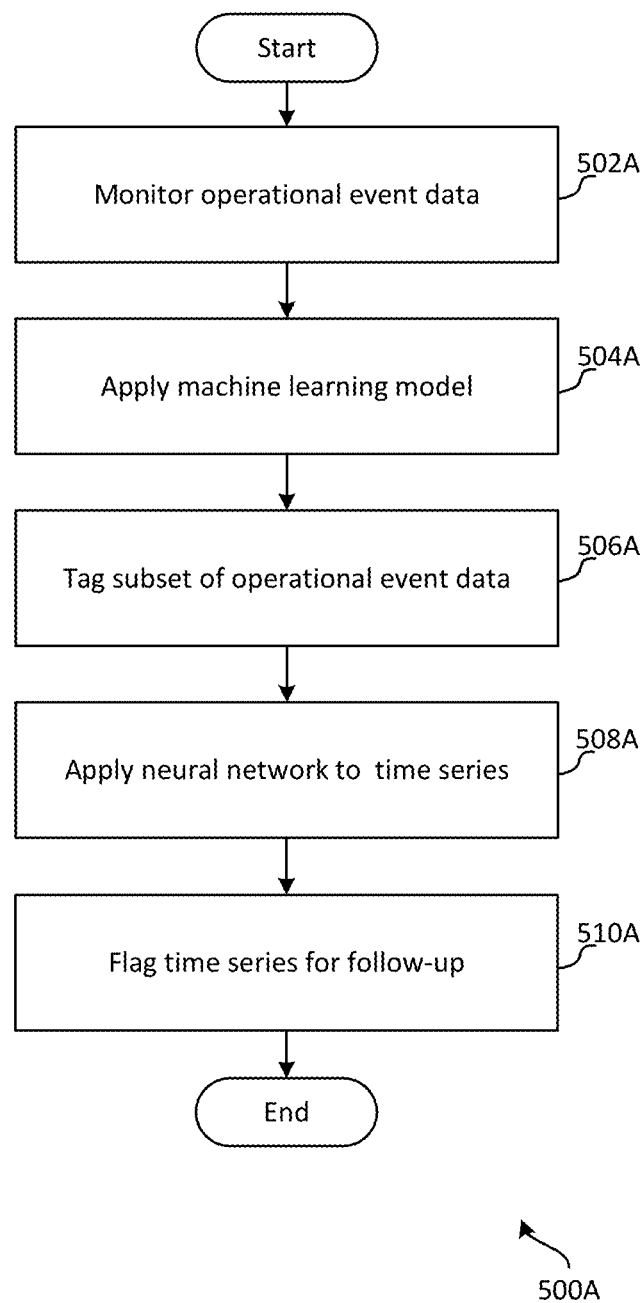
FIG. 5A is an exemplary method for detecting and classifying service issues associated with a cloud-based application service.

FIG. 5A is an exemplary method 500A for detecting and classifying service issues associated with a cloud-based application service. The method 500A begins at a start operation and flow moves to operation 502A.

At operation 502A operational event data for a plurality of operations associated with the cloud-based application service is monitored. According to examples, the plurality of operations may each be of the same operation type (e.g., a save document operation type; a send message operation type; an open new document operation type, etc.). In other examples, the plurality of operations may be of different operation types. The operational data may be monitored by a monitoring service and/or a telemetry service. The operational data may include: an indication of an operation type for each operation that is being executed; an indication of a time that each operation was executed and/or initiated; an indication of how long each operation took to complete or time out; an identity of a server or server farm that executed each operation; and/or an approximate location of where each operational request originated.

From operation 502A flow continues to operation 504A where a statistical-based unsupervised machine learning model is applied to the operational event data. In examples, the statistical-based unsupervised machine learning model may be applied to a specified time series of the operational data that is monitored. In examples, the time series may comprise operations of a specific type that have been executed or initiated over a specified duration of time. The specified duration of time may be seconds, minutes, hours, days, weeks or months. According to some examples, rather than applying the statistical-based unsupervised machine learning model to every operation of a specific operation type that was executed over the specified duration of time, the statistical-based unsupervised machine learning model may only be applied to a subset of those operations (e.g., based on location, based on server that executed the operations, etc.). The unsupervised machine learning model applied to the time series data may comprise a Gaussian model, a bloxplot method model, a one class support vector machine model, and/or a density-based spatial clustering of applications with noise model, for example. Those models may identify whether one or more operational events in the time series fall within normalized patterns of the system, or whether they are outliers that may need further review.

From operation 504A flow continues to operation 506A where a subset of the operational event data is tagged, based on application of the unsupervised machine-learning model, as potentially being associated with a code regression, network issue and/or hardware problem. In some examples, the subset of operational event data may comprise all or a portion of a time series of operational event data that the statistical-based unsupervised machine learning model was applied to at operation 504.

From operation 506A flow continues to operation 508A where a neural network is applied to the time series of operational event data. In examples, the neural network may be a convolutional neural network that is applied to graphical image representation of the time series of operational event data. The neural network may have been manually trained to identify code regressions, network issues and/or hardware problems based on manually classified time series operational event data.

From operation 508A flow continues to operation 510A where the time series of operational event data is flagged for follow-up if the neural network classifies the time series as relating to a positive code regression category. That is, the operational event data is flagged for follow-up if the neural network identifies all or a portion of the operational event data that it is applied to as corresponding to a code regression. In some examples, the neural network may have one or more additional categories that it may classify time series data into. For example, the neural network may classify time series/operational event data into categories based on type of issue that is associated with it (e.g., code regression, network error, hardware issue), severity of the issue (e.g., based on how many users are impacted, based on the operation type that is causing the issue, etc.), and/or based on a likelihood that an issue relates to one or more issues (e.g., more than 70% likely that an issue relates to code regression, more than 90% likely that an issue relates to a network error, etc.).

From operation 510A flow moves to an end operation and the method 500A ends.

Figure 5B:
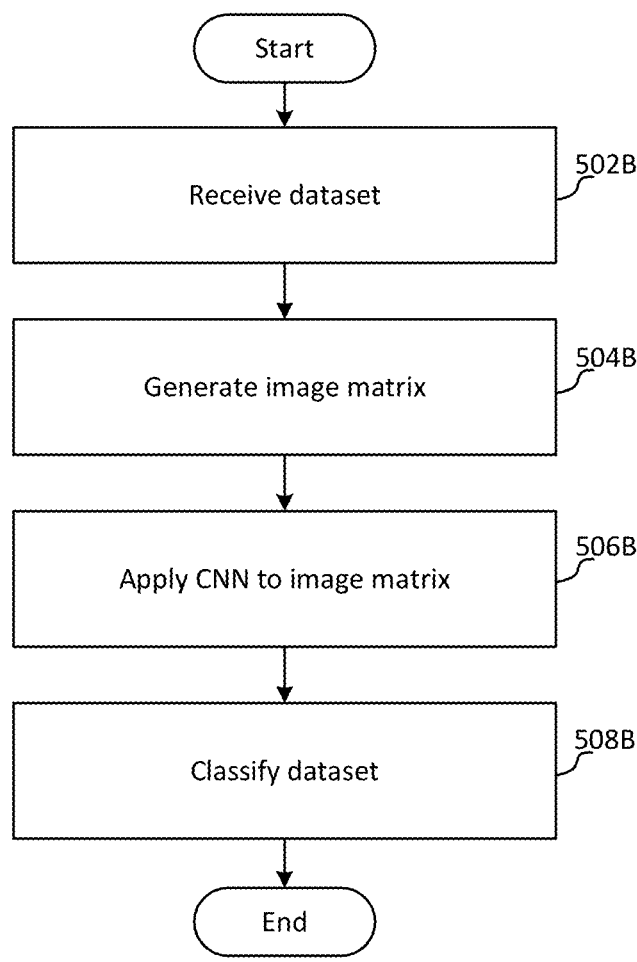
FIG. 5B is another exemplary method for detecting and classifying service issues associated with a cloud-based application service.

FIG. 5B is another exemplary method 500B for detecting and classifying service issues associated with a cloud-based application service. The method 500B begins at a start operation and flow moves to operation 502B.

At operation 502B a time series dataset corresponding to a plurality of operational events of the cloud-based application service is received. The operational events may relate to execution of a same operation type over seconds, minutes, hours, days and/or weeks. In other examples, the operational events may relate to execution of different operation types over seconds, minutes, hours, days and/or weeks.

From operation 502B flow continues to operation 504B where an image matrix of the dataset is generated. The image matrix may comprise a graphical classification of each of the operational events as one of a plurality of result types comprising: an expected error result type; an unexpected error result type; and a success result type. Each unit of the matrix may correspond to a unit of time of the time series. For example, one set of units in the matrix corresponding to the expected error result type may illustrate a number of expected errors associated with execution of a specific operation type per unit of time in the matrix. Another set of units in the matrix corresponding to the unexpected error result type may illustrate a number of unexpected errors associated with execution of the specific operation type per unit of time in the matrix. Another set of units in the matrix may correspond to a number of successfully executed operations of the specific operation type per unit of time in the matrix. The number of operations that resulted in expected results, unexpected results, and/or successful execution may be graphically illustrated in the image matrix in various manners, including shading, coloring, value elements on a graph, etc.

From operation 504B flow continues to operation 506B where a convolutional neural network is applied to the image matrix of the dataset. The convolutional neural network may have been trained to classify the image matrix into one or more categories. The categories may comprise: a yes issue type (i.e., image matrix/time series relates to a code regression, a network issue, and/or a hardware problem), a no issue type (i.e., the image matrix/time series does not relate to a code regression, a network issue, and/or a hardware problem), an issue type classification (i.e., classifying the image matrix/time series into the specific type of issue that is causing operational errors), and/or a severity of issue classification type.

From operation 506B flow continues to operation 508B where the time series dataset is classified by the convolutional neural network as corresponding to a code regression or not corresponding to a code regression. The time series dataset may additionally be classified into any of the other categories discussed above that the neural network may be trained to classify datasets into.

From operation 508B flow moves to an end operation and the method 500B ends.

Figure 6:
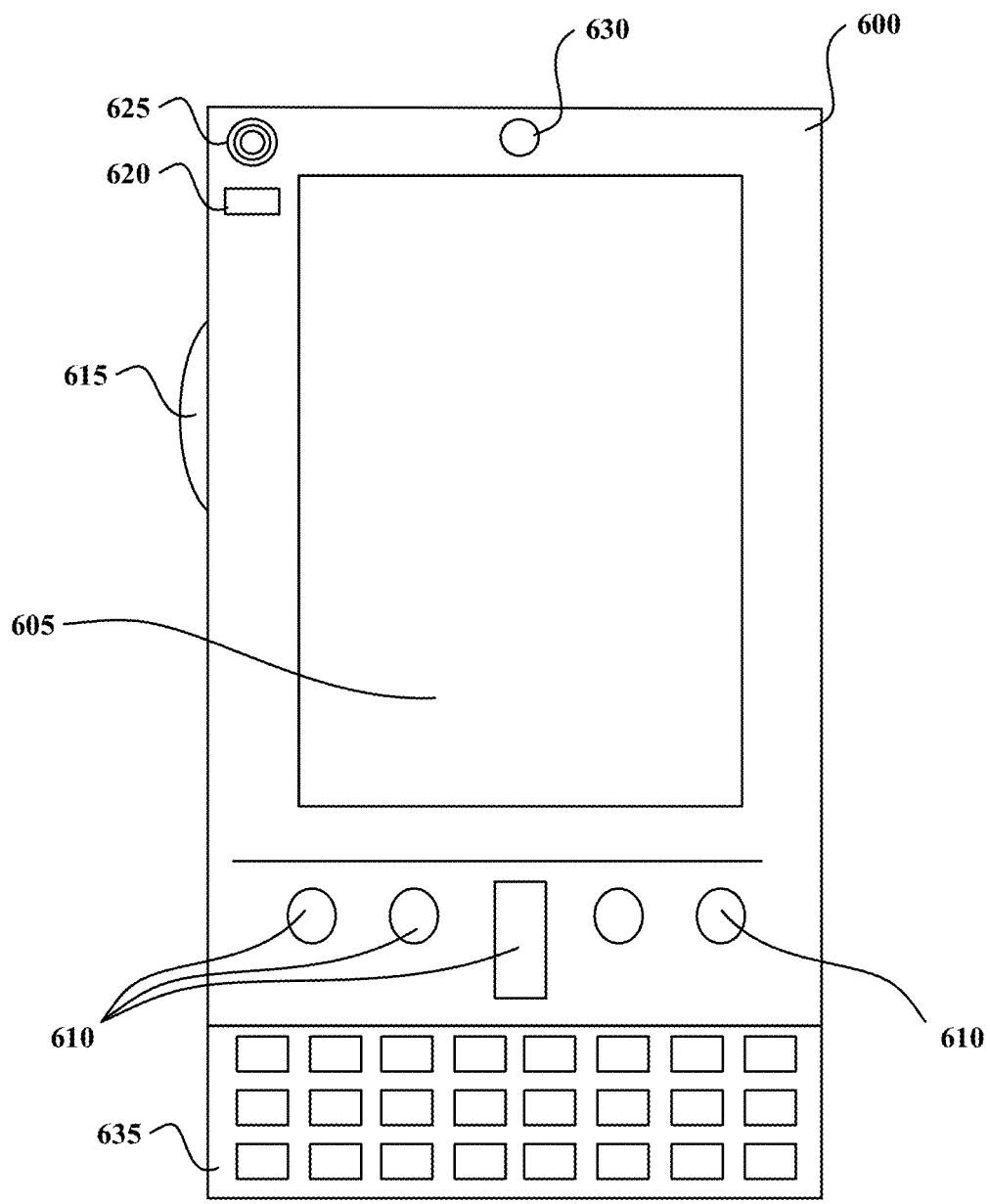
FIGS. 6 and 7 are simplified diagrams of a mobile computing device with which aspects of the disclosure may be practiced.
Figure 7:
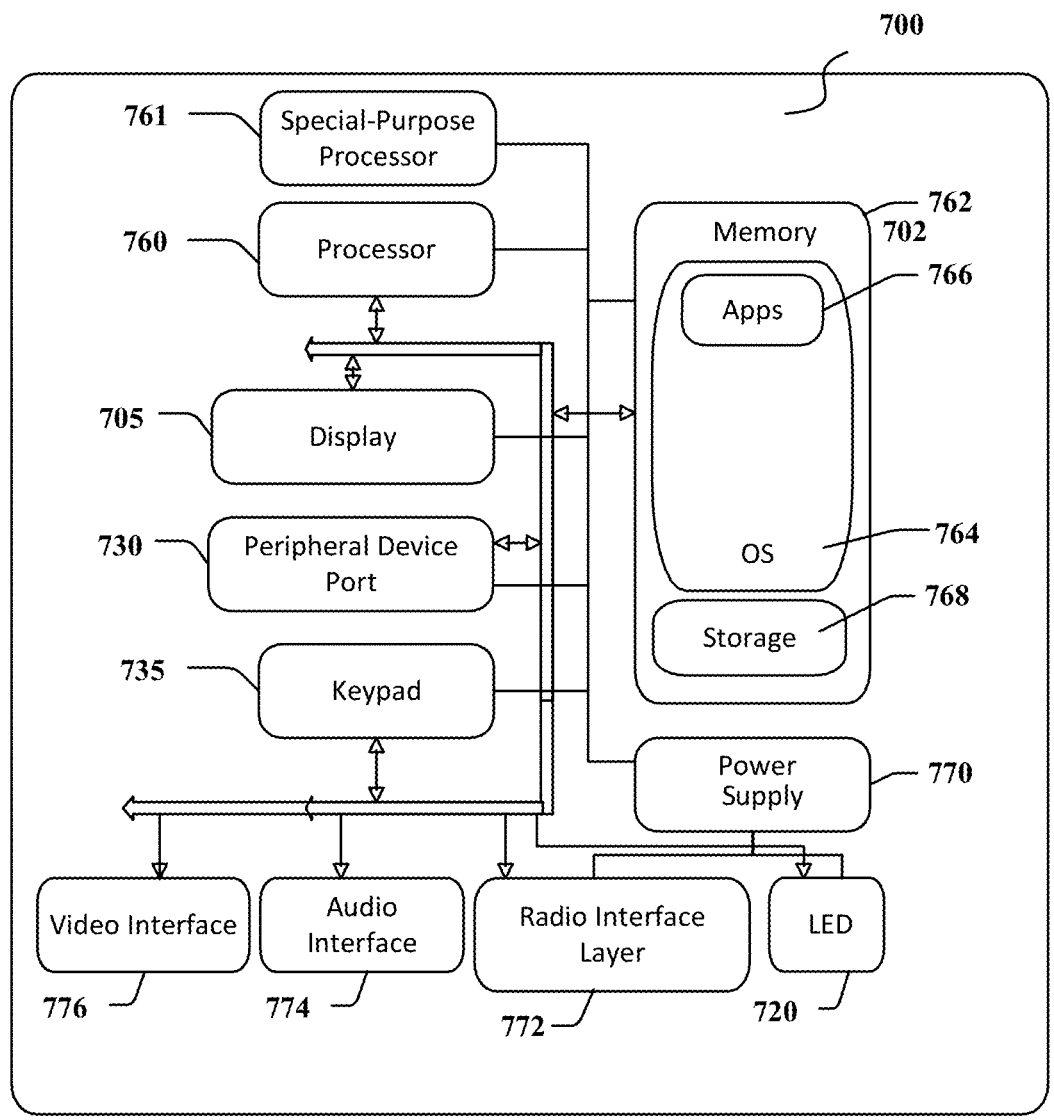

FIGS. 6 and 7 illustrate a mobile computing device 600, for example, a mobile telephone, a smart phone, wearable computer, a tablet computer, an e-reader, a laptop computer, AR compatible computing device, or a VR computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
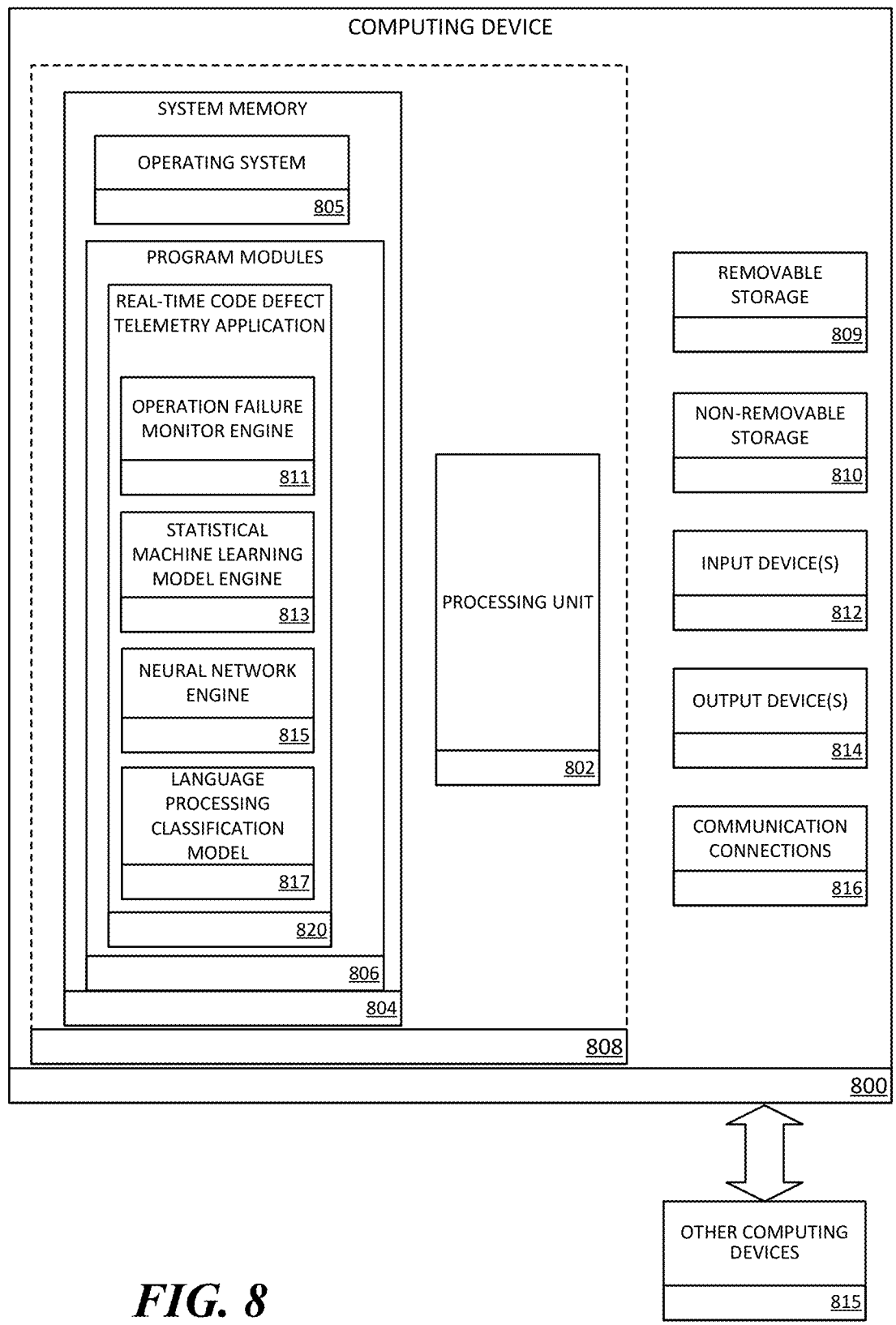
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for detecting code regressions, network issues and/or hardware problems associated with cloud-based application services. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more code regressions system monitoring programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., real-time code regression telemetry application 820) may perform processes including, but not limited to, the aspects, as described herein. According to examples, operation failure monitor engine 811 may perform one or more operations associated with monitoring telemetry data for a plurality of operations executed by applications hosted by a cloud-based application service. Statistical machine learning model engine 813 may perform one or more operations associated with applying one or more machine learning models to operational event time series data to determine whether one or more datapoints in those time series relate to code regressions, network issues and/or hardware problems in the service, and the tagging of those datapoints. Neural network engine 815 may perform one or more operations on time series operational event data that has been tagged by the statistical machine learning model engine 813, including applying a convolutional neural network to that data. The convolutional neural network may have been trained to classify time series operational even data into one or more categories, such as issue type, issue severity, etc. Language processing classification model 817 may take time series data that has been positively classified as relating to a code regression, network issue and/or hardware problem and applying a language processing model to those operation logs to further classify that data into categories such as, which operation was responsible for the issue, what server or server farm was responsible for the issue, how severe the impact of the issue is in the system, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
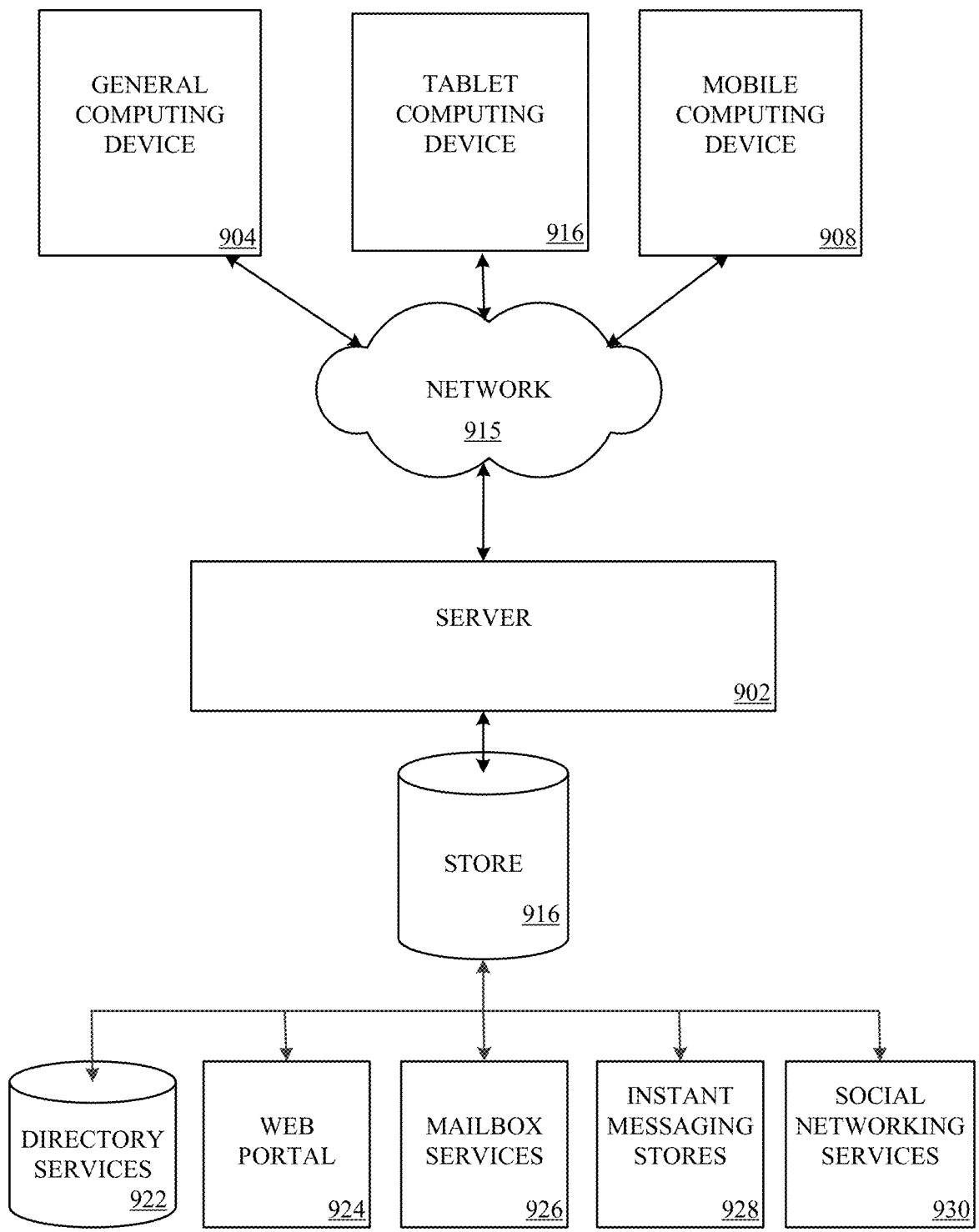
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for detecting code regressions associated with a cloud-based application service, the method comprising:
monitoring operational event data for a plurality of operations associated with the cloud-based application service to generate a time series of the operational event data;
applying a statistical-based unsupervised machine learning model to the time series of the operational event data for the plurality of operations, wherein the statistical-based unsupervised machine learning model is trained to identify datapoints that fall outside of a normalized pattern for a relevant operation of the plurality of operations;

tagging the operational event data for operations comprising the identified datapoints to generate a subset of the time series of the operational event data;

providing the subset of the time series of the operational event data to a neural network trained to classify the operations in the subset of the time series of the operational event data into one of a first category indicating the subset of the time series of the operational event data is related to a code regression and a second category indicating the subset of the time series of the operational event data is not related to a code regression;

flagging one or more of the operations in the subset of the time series of operational event data for follow-up based on a classification into the first category to generate a limited subset of the time series of operational event data;

applying a language processing model to the limited subset of the time series of operational event data to generate a cause of the flagging; and providing the limited subset of the time series of operational event data and the cause of the flagging for the follow-up.

2. The method of claim 1, wherein the neural network is a convolutional neural network and the convolutional neural network is applied to a graphical image representation of the subset of the time series of the operational event data.

3. The method of claim 1, wherein the neural network has been further trained to identify code regressions based on manually classified time series operational event data.

4. The method of claim 1, wherein the applying the language processing model to the limited subset of the time series of operational event data comprises applying the language processing model to operational data logs associated with the operations in the limited subset of the time series of operational event data.

5. The method of claim 1, further comprising:
ignoring the operational event data of an operation if the neural network classifies the operation in the second category.

6. The method of claim 1, wherein the statistical-based unsupervised machine learning model is one of: a Gaussian model; a boxplot method model; a one class support vector machine model; and a density-based spatial clustering of applications with noise model.

7. The method of claim 1, wherein the applying the language processing model to the limited subset of the time series of operational event data comprises:
identifying a plurality of error logs corresponding to operational events in the limited subset of the time series of the operational event data;
applying the language processing model to each of the error logs; and
classifying, based on the application of the language processing model, each operational event in the limited subset of the time series of the operational event data into a severity category.

8. The method of claim 7, wherein the classification into the severity category is based on one or more of: a type of operational event; a number of users that are impacted by a code regression; and a number of sites that are currently still experiencing errors associated with the code regression.

9. The method of claim 1, wherein the language processing model is one of: a recurrent neural network; a convolutional neural network; a bag-of-words model; a rule-based model; a random forest model; and a word segmentation model.

10. A system for identifying and classifying service issues associated with a cloud-based application service, comprising:
a memory for storing executable program code; and
one or more processors, functionally coupled to the memory, the one or more processors being responsive to computer-executable instructions contained in the program code and operative to:
receive a time series dataset corresponding to a plurality of operational events of the cloud-based application service;
apply a statistical-based unsupervised machine learning model to the time series dataset, wherein the statistical-based unsupervised machine learning model is trained to identify datapoints that fall outside of a normalized pattern for a relevant operation of the plurality of operational events;
tagging the operational events comprising the identified datapoints to generate a subset of the time series dataset;
generate an image matrix of the subset of the time series dataset, wherein the image matrix comprises a graphical classification of each of the operational events in the subset of the time series dataset;
apply a convolutional neural network to the image matrix of the subset of the time series dataset to classify the operational events in the subset of the time series dataset into one of a first category indicating the subset of the time series dataset is related to a code regression and a second category indicating the subset of the time series dataset is not related to a code regression;
flag one or more of the operational events in the subset of the time series dataset for follow-up based on a classification into the first category to generate a limited subset of the time series dataset;
apply a language processing model to the limited subset of the time series dataset to generate a cause of the flag; and
provide the limited subset of the time series dataset and the cause of the flag for the follow-up.

11. The system of claim 10, wherein the convolutional neural network has been trained to identify code regressions based on manually classified time series operational event data.

12. A computer-readable storage device comprising executable instructions that, when executed by one or more processors, assists with detecting code regressions associated with a cloud-based application service, the computer-readable storage device including instructions executable by the one or more processors for:
monitoring operational event data for a plurality of operations associated with the cloud-based application service to generate a time series of operational event data;
applying a statistical-based unsupervised machine learning model to the time series of the operational event data for the plurality of operations, wherein the statistical-based unsupervised machine learning model is trained to identify datapoints that fall outside of a normalized pattern for a relevant operation of the plurality of operations;
tagging the operational event data for operations comprising the identified datapoints to generate a subset of the time series of the operational event data;

providing the subset of the time series of the operational event data to a neural network trained to classify the operations in the subset of the time series of the operational event data into one of a first category indicating the subset of the time series of the operational event data is related to a code regression and a second category indicating the subset of the time series of the operational event data is not related to a code regression;

flagging one or more of the operations in the subset of the time series of operational event data for follow-up based on a classification into the first category to generate a limited subset of the time series of operational event data;

applying a language processing model to the limited subset of the time series of operational event data to generate a cause of the flagging; and providing the limited subset of the time series of operational event data and the cause of the flagging for the follow-up.

13. The computer-readable storage device of claim 12, wherein the neural network is a convolutional neural network.

14. The computer-readable storage device of claim 12, wherein the neural network has been further trained to identify code regressions based on manually classified time series operational event data.

15. The computer-readable storage device of claim 12, wherein the neural network is a convolutional neural network, and the convolutional neural network is applied to a graphical image representation of the subset of the time series of the operational event data.

16. The computer-readable storage device of claim 12, wherein the instructions are further executable by the one or more processors for:

ignoring the operational event data of an operation if the neural network classifies the operation in the second category.

17. The computer-readable storage device of claim 12, wherein the statistical-based unsupervised machine learning model is one of: a Gaussian model; a boxplot method model; a one class support vector machine model; and a density-based spatial clustering of applications with noise model.

18. The computer-readable storage device of claim 12, wherein the instructions for applying the language processing model to the limited subset of the time series of operational event data are further executable by the one or more processors for:

identifying a plurality of error logs corresponding to operational events in the limited subset of the time series of the operational event data;

applying the language processing model to each of the error logs; and classifying, based on the application of the language processing model, each operational event in the limited subset of the time series of the operational event data into a severity category.

19. The computer-readable storage device of claim 18, wherein the classification into the severity category is based on one or more of: a type of operational event; a number of users that are impacted by a code regression; and a number of sites that are currently still experiencing errors associated with the code regression.

20. The computer-readable storage device of claim 12, wherein the language processing model is one of: a recurrent neural network; a convolutional neural network; a bag-of-words model; a rule-based model; a random forest model; and a word segmentation model.

* * * * *